United States Patent Office 3,649,639
Patented Mar. 14, 1972

3,649,639
PREPARATION OF 1-(1-SUBSTITUTED-5-NITRO-2-IMIDAZOLECARBOXIMIDOYL) - 3 - THIOSEMI-CARBAZIDES
Ira Starer, Somerville, and Christos George Papaioannou, Somerset, N.J., assignors to American Cyanamid Company, Stamford, Conn.
No Drawing. Filed Oct. 7, 1969, Ser. No. 864,530
Int. Cl. C07d 49/36
U.S. Cl. 260—309                                   10 Claims

ABSTRACT OF THE DISCLOSURE

The reaction of 1-substituted-2-cyano-5-nitroimidazole with thiosemicarbazide to produce 1-(1-substituted-5-nitro-2-imidazolecarboximidoyl)-3-thiosemicarbazide is described. The latter compounds can be cyclized to produce 2-(2-amino - 1,3,4 - thiadiazole-5-yl)-1-substituted-5-nitroimidazole. The latter compounds are useful as antibacterial or antiparasitic agents.

DESCRIPTION OF THE INVENTION

The invention relates to the preparation of compounds of the formula:

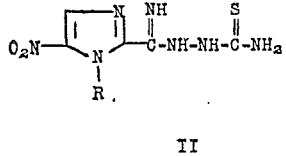

II wherein R is lower alkyl, loweralkanoyloxyloweralkyl, benzoyloxyloweralkyl, and hydroxyloweralkyl. The term loweralkyl in all instances is intended to include those having 1 to 4 carbon atoms. More particularly, it relates to a method for the preparation of the above compounds, which involves the reaction of compounds of the formula:

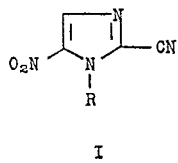

I wherein R is as defined above, with thiosemicarbazide and a solvent.

In accordance with the preferred method of the present invention a 2-cyano-1-substituted-5-n-nitroimidazole (I) is admixed with thiosemicarbazide in an organic aprotic or protic solvent, such as dimethylsulfoxide, dimethylformamide, formamide, dimethylacetamide, propanol, β-methoxyethanol, β-ethoxyethanol or butanol, at a temperature of 25° to 100° C. for a period of time of from about 1 hour to 124 hours. The reaction is preferably carried out at a temperature of about 60° C. to about 100° C. for a period of 4 hours to 20 hours. Cyclization of the thus prepared imidazolecarboximidolyl thiosemicarbazide (II) then yields 1-substituted 2-(2-amino-1,3,4-thiadiazol-5-yl)-5-nitroimidazoles (III). This latter reaction is most favorably carried out by heating, preferably refluxing, in aqueous hydrochloric acid or concentrated sulfuric acid. The overall reaction can be depicted as follows:

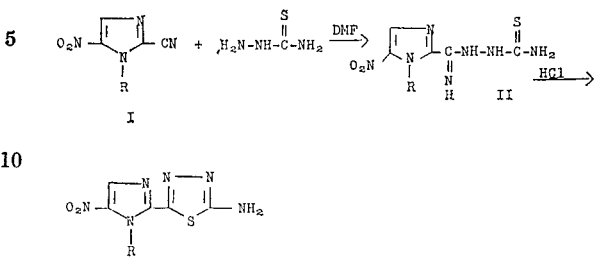

wherein R is as hereinbefore defined.

The process of the invention is highly effective for the preparation of compounds useful for the control of bacterial, parasitic and protozoal infections in poultry and animals. They find utility as antimicrobial agents effective against *Trichomonas vaginalis* and *Salmonella gallinarum* infections in poultry and animals as described by Berkelhammer et al. in U.S. Pat. 3,452,035.

The method of the present invention affords a surprising and unexpected route through a useful intermediate to the active compounds, thereby resulting in economies of time and money. The present invention is surprising and novel since it was heretofore unknown to react efficiently a nitrile with thiosemicarbazide directly to obtain compounds such as (II). In fact, it has been demonstrated that the reaction seems to be unique in that it does not take place with certain other nitriles containing electron withdrawing groups which might be expected to activate the nitrile. The mechanism of the reaction is not known, but has been found to work with the present nitriles. Other nitriles such as those of Example 4 are substantially unreactive under the conditions of the present invention.

In carrying out the present process, the reaction to produce 1-(1 - substituted-5-nitro-2-imidazolecarboximidoyl)-3-thiosemicarbazides gives higher yields in solvents such as dimethylsulfoxide or dimethylformamide.

SPECIFIC DESCRIPTION

The following examples describe the process of preparing 1-(1-substituted-5-nitro-2-imidazole carboximidoyl)-3-thiosemicarbazides and the use of these compounds for conversion to 2-(2-amino-1,3,4-thiadiazol-5-yl)-1-substituted-5-nitroimidazoles which are physiologically active.

EXAMPLE 1

Preparation of 1-(1-methyl-5-nitro-2-imidazolecarboximidoyl)-3-thiosemicarbazide A mixture of 2 grams (0.0132 mole) of 1-methyl-2-cyano-5-nitroimidazole, 1.31 grams (0.0144 mole) of thiosemicarbazide and 10 ml. of dimethylformamide is heated on a steam bath (96° C.) for 124 hours. Water (30 ml.) is added to the reaction mixture and the resulting precipitate is washed with 2–10 ml. portions of water by decantation, filtered, washed again with 2–10 ml. portions of water, 5 ml. of acetone, and dried. There is obtained 2.47 grams (77%) of 1-(1-methyl-5-nitro-2-imidazolecarboximidoyl)-3-thiosemicarbazide, melting point 207–208° C. (d). The infrared spectrum is identical with that of an authentic sample.

EXAMPLE 2

Preparation of 1-(1-methyl-5-nitro-2-imidazolecarboximidoyl)-3-thiosemicarbazide A mixture of 2 grams (0.0132 mole) of 1-methyl-2-cyano-5-nitroimidazole, 1.55 grams (0.0170 mole) of thiosemicarbazide and 15 ml. of dimethyl sulfoxide is heated on a steam bath for 63 hours. Water (25 ml.) is added to the reaction mixture and the resulting precipitate is filtered, washed with water and dried. There is obtained 2.37 grams (74%) of 1-(1-methyl-5-nitro-2-imidazolecarboximidoyl)-3-thiosemicarbazide, melting point 204–5° C. (d.), I.R., spectrum identical with that of an authentic sample.

EXAMPLE 3

Preparation of 1-(1-methyl-5-nitro-2-imidazolecarboximidoyl)-3-thiosemicarbazide A mixture of 2 grams (0.0132 mole) of 1-methyl-2-cyano-5-nitroimidazole, 1.31 grams (0.0144 mole) of thiosemicarbazide and 20 ml. of Cellosolve is refluxed for 9 hours. The reaction mixture is then drowned in 80 ml. of water and the resulting precipitate is filtered, washed with water and dried. There is obtained 1.78 grams (56%) of 1-(1 - methyl-5-nitro-2-imidazolecarboximidoyl)-3-thiosemicarbazide, melting point 205–10° C. (d.).

EXAMPLE 4

Nitriles and their reaction

Various nitriles, shown in the table below, are heated for 42 hours on a steam bath with thiosemicarbazide in dimethylformamide. Stoichiometry:

nitrile—0.0132 mole+thiosemicarbazide—0.0144 mole+10 ml. dimethylformamide

| Nitrile | Product |
| --- | --- |
| 1-methyl-2-cyano-5-nitroimidazole. | 74% 1-(1-methyl-5-nitro-2-imidazolecarboximidoyl)-3-thiosemicarbazide, melting point 207–8° C. (d.). |
| p-NO₂C₆H₄CN | 90% recovery of nitrile; traces of other products. |
| p-ClC₆H₄CN | 99% recovery of nitrile. |
| m-NO₂C₆H₄CN | 88% recovery of nitrile; no sign of desired product. |
| C₆H₅CN | Starting materials recovered. |
| o-CH₃C₆H₄CN | Do. |

This example illustrates the selectivity of the reaction of thiosemicarbazide with nitriles. No other nitrile has been found to react with thiosemicarbazide under the conditions of this invention.

EXAMPLE 5

Preparation of 2-(2-amino-1,3,4-thiadiazol-5-yl)-1-methyl-5-nitroimidazole

The compound 1-(1-methyl-5-nitro-2-imidazolecarboximidoyl)-3-thiosemicarbazide (0.6 g.) is heated with 14 ml. of 6 N hydrochloric acid for 15 minutes. The resulting solution is cooled and diluted with water. The solid is filtered, washed with water and dried. The product 2-(2-amino-1,3,4-thiadiazol-5-yl)-1-methyl - 5 - nitroimidazole having a melting point 266–268° C. (d.), is obtained.

EXAMPLE 6

Preparation of 2-(2-amino-1,3,4-thiadiazol-5-yl)-1-methyl-5-nitroimidazole

The compound 1-(1-methyl-5-nitro-2-imidazolecarboximidoyl)-3-thiosemicarbazide (0.49 g.) is heated with 5 ml. of methanol containing 0.5 ml. of concentrated hydrochloric acid. The cyclization takes place producing the compound above having a melting point of 266°–268° C. (d.).

EXAMPLE 7

Preparation of 1-[1-(β-acetoxyethyl)-5-nitro-2-imidazolecarboximidoyl)-3-thiosemicarbazide A mixture of 2.9 grams (0.013 mole) of 1-(β-acetoxyethyl)-2-cyano-5-nitroimidazole (U.S. Pat. No. 3,341,-549), 1.31 grams (0.0144 mole) of thiosemicarbazide and 10 ml. of dimethylformamide is heated on a steam bath (95° C.) for 42 hours. The reaction mixture is worked up by a procedure similar to that set forth in Example 1, whereupon 1-[1-(β - acetoxyethyl)-5-nitro-2-imidazolecarboximidoyl]-3-thiosemicarbazide is obtained.

EXAMPLE 8

Preparation of 1-[1-(β-benzoyloxyethyl)-5-nitro-2-imidazolecarboximidoyl]-3-thiosemicarbazide The process of Example 7 is repeated except that an equivalent amount of 1-(β-benzoyloxyethyl)-2-cyano-5-nitroimidazole is used instead of 1-(β-acetoxyethyl)-2-cyano-5-nitroimidazole. The former compound can be prepared in accordance with a method described in U.S. Pat. 3,341,549.

EXAMPLE 9

Preparation of 2-(2-amino-1,3,4-thiadiazol-5-yl)-1-(β-benzoyloxyethyl)-5-nitroimidazole The compound 1-[1-(β-benzoyloxyethyl)-5-nitro-2-imidazolecarboximidoyl]-3-thiosemicarbazide (Example 8) is heated in dimethylformamide in the presence of hydrogen chloride. The resulting solution is cooled and diluted with water. The solid is filtered off, washed with water and dried. The product 2-(2-amino-1,3,4-thiadiazol-5-yl)-1-(β-benzoyloxyethyl)-5-nitroimidazole is obtained.

EXAMPLE 10

Preparation of 1-[1-(β-hydroxyethyl)-5-nitro-2-imidazolecarboximidoyl]-3-thiosemicarbazide The process of Example 7 is repeated except that an equivalent amount of 1-(β-hydroxyethyl)-2-cyano-5-nitroimidazole is used instead of 1-(β-acetoxyethyl)-2-cyano-5-nitroimidazole. The former compound may be prepared in accordance with a method described in U.S. Pat. No. 3,341,549.

We claim:

1. A method of preparing a nitroimidazole of the formula:

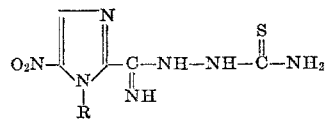

wherein R is loweralkyl, loweralkanoyloxyloweralkyl, benzoyloxyloweralkyl and hydroxyloweralkyl, which comprises heating a compound of the formula:

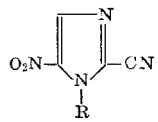

wherein R is as defined above, with thiosemicarbazide in an organic aprotic or protic solvent at a temperature of from about 25° C. to 100° C. for a period of from 1 hour to 124 hours.

2. A method of preparing a nitroimidazole according to claim 1, wherein the organic aprotic solvent is formamide, dimethylformamide, dimethylacetamide or dimethylsulfoxide.

3. A method of preparing a nitroimidazole according to claim 1, wherein the organic protic solvent is β-methoxyethanol, β-ethoxyethanol, propanol or butanol.

4. A method of preparing a nitroimidazole according to claim 1, wherein the starting material is 1-loweralkyl-2-cyano-5-nitroimidazole and the solvent is formamide, dimethylformamide, dimethylacetamide, dimethylsulfoxide, β-methoxyethanol, β-ethoxyethanol, propanol or butanol.

5. A method of preparing a nitroimidazole according to claim 1, wherein the starting material is 2-cyano-1-methyl-5-nitroimidazole, and the solvent is formamide, dimethylformamide, dimethylacetamide, dimethylsulfoxide, β-methoxyethanol, β-ethoxyethanol, propanol or butanol.

6. A method of preparing a nitroimidazole according to claim 1, wherein the starting material is 2-cyano-1-benzoyloxyloweralkyl-5-nitroimidazole, the time is 4 hours to 20 hours and the solvent is formamide, dimethylformamide, dimethylacetamide, dimethylsulfoxide, β-methoxyethanol, β-ethoxyethanol, propanol or butanol.

7. A method of preparing a nitroimidazole according to claim 1, wherein the starting material is 2-cyano-1-benzoyloxyethyl-5-nitroimidazole, the time is 4 hours to 20 hours and the solvent is formamide, dimethylformamide, dimethylacetamide, dimethylsulfoxide, β-methoxyethanol, β-ethoxyethanol, propanol or butanol.

8. A method of preparing a nitroimidazole according to claim 1, wherein the starting material is 2-cyano-1-(β-acetoxyloweralkyl)-5-nitroimidazole, the time is 4 hours to 20 hours and the solvent is formamide, dimethylformamide, dimethylacetamide, dimethylsulfoxide, β-methoxyethanol, β-ethoxyethanol, propanol or butanol.

9. A method of preparing a nitroimidazole according to claim 1, wherein the starting material is 2-cyano-1-hydroxyloweralkyl-5-nitroimidazole, the time is four hours to 20 hours and the solvent is formamide, dimethylformamide, dimethylacetamide, dimethylsulfoxide, β-methoxyethanol, β-ethoxyethanol, propanol or butanol.

10. A method of preparing 1-(1-methyl-5-nitro-2-imidazolcarboximidoyl) - 3 - thiosemicarbazide which comprises heating 1-methyl-2-cyano-5-nitroimidazole with thiosemicarbazide in the presence of dimethylformamide at a temperature of from 60° C. to 100° C. for a period of from 1 to 124 hours and recovering said product therefrom.

References Cited

UNITED STATES PATENTS

| | | | |
|---|---|---|---|
| 2,277,861 | 3/1942 | Erwins et al. | 260—564 R |
| 2,543,341 | 2/1951 | Smith et al. | 260—564 R |
| 3,402,193 | 9/1968 | Hagemeyer, Jr. et al. | 260—564 R |
| 3,458,500 | 7/1969 | Davis | 260—564 R |
| 2,676,985 | 4/1954 | Husted | 260—564 R |
| 3,299,081 | 1/1967 | Sletzinger et al. | 260—564 R |
| 3,309,374 | 3/1967 | Schaefer | 260—564 R |
| 2,049,582 | 8/1936 | Ziegler | 260—564 R |
| 2,433,489 | 12/1947 | Short et al. | 260—564 R |
| 2,450,386 | 9/1948 | Short et al. | 260—564 R |

FOREIGN PATENTS

| | | | |
|---|---|---|---|
| 605,952 | 8/1948 | Great Britain | 260—564 R |

OTHER REFERENCES

Kittila, Dimethylformamide Chemical Uses, pp. VIII–IX, Wilmington, du Pont, 1967.

Shriner et al., Chem. Rev., vol. 35, pp. 354, 355, 363, 364 and 373 (1944). QD1.A563.

Taniguchi, Chem. Abst., vol. 52, cols. 14593–4 (1958). QD1.A51.

Parker, Advances in Organic Chemistry, vol. 5, pp. 2–3 (1965). QD251.A3.

Grivas et al., Can. J. Chem., vol. 36, pp. 771–4 (1958). QD1.C2.

NATALIE TROUSOF, Primary Examiner

U.S. Cl. X.R.

260—306.8 D, 999